United States Patent
Sugai et al.

(10) Patent No.: US 11,007,614 B2
(45) Date of Patent: May 18, 2021

(54) WORKPIECE RETENTION DEVICE AND WORKPIECE RETENTION METHOD

(71) Applicant: MITSUBUSHI HEAVY INDUSTRIES, LTD., Tokyo (JP)

(72) Inventors: Atsushi Sugai, Tokyo (JP); Shota Hosoi, Tokyo (JP); Takashi Shibutani, Tokyo (JP); Kengo Imaoka, Tokyo (JP); Megumu Tsuruta, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 217 days.

(21) Appl. No.: 16/315,025

(22) PCT Filed: Jun. 7, 2017

(86) PCT No.: PCT/JP2017/021178
§ 371 (c)(1),
(2) Date: Jan. 3, 2019

(87) PCT Pub. No.: WO2018/012154
PCT Pub. Date: Jan. 18, 2018

(65) Prior Publication Data
US 2020/0009697 A1    Jan. 9, 2020

(30) Foreign Application Priority Data

Jul. 13, 2016  (JP) .............................. JP2016-138736

(51) Int. Cl.
*B23Q 3/08*    (2006.01)
*B25B 11/00*   (2006.01)

(52) U.S. Cl.
CPC ............ *B23Q 3/088* (2013.01); *B25B 11/005* (2013.01)

(58) Field of Classification Search
CPC .. B23Q 3/06; B23Q 3/08; B23Q 3/064; B23Q 3/088; B23Q 3/062; B23Q 1/037;
(Continued)

(56) References Cited

U.S. PATENT DOCUMENTS

| 4,183,511 | A | * | 1/1980 | Marek | ..................... B66C 23/48 254/100 |
| 5,107,599 | A | * | 4/1992 | Marincic | .............. G01B 5/0004 269/309 |

(Continued)

FOREIGN PATENT DOCUMENTS

| DE | 102008051116 A1 | 4/2009 |
| EP | 1075903 A2 | 2/2001 |

(Continued)

OTHER PUBLICATIONS

Extended European Search Report for European Application No. 17827286.0 dated May 6, 2019; 8pp.

*Primary Examiner* — Tyrone V Hall, Jr.
(74) *Attorney, Agent, or Firm* — Hauptman Ham, LLP

(57) ABSTRACT

Provided is a workpiece retention device that retains a frame which includes a workpiece main body and a lip flange and a base flange that are provided to the workpiece main body, wherein: the workpiece retention device comprises a plurality of grippers that are aligned in the lengthwise direction of the frame, and a horizontal movement mechanism and a vertical movement mechanism that move the plurality of grippers; the gripper each include: a lower block, a workpiece support pin that is provided to the lower block and that supports the frame, an upper block that can move toward the base flange of the supported frame, a block movement mechanism that moves the upper block; and a suction mechanism that is provided to the upper block and that suctions the workpiece main body on the base flange side.

10 Claims, 9 Drawing Sheets

(58) Field of Classification Search
CPC .......... B23Q 1/262; B23Q 1/28; B23Q 1/282; B23Q 1/285; B25B 11/00; B25B 11/005; B25J 19/0091; B25J 15/0616
See application file for complete search history.

(56) References Cited

U.S. PATENT DOCUMENTS

| | | | | |
|---|---|---|---|---|
| 5,265,928 A | * | 11/1993 | Sonobe | B25J 19/0091 294/119.4 |
| 6,170,157 B1 | * | 1/2001 | Munk | B23P 21/00 244/123.1 |
| 6,413,022 B1 | * | 7/2002 | Sarh | B21J 15/10 408/16 |
| 9,352,432 B2 | * | 5/2016 | De Mattia | B25B 5/067 |
| 2013/0249158 A1 | | 9/2013 | De Mattia | |

FOREIGN PATENT DOCUMENTS

| | | |
|---|---|---|
| EP | 2641697 A1 | 9/2013 |
| JP | H05031836 A | 2/1993 |

* cited by examiner

WORKPIECE RETENTION DEVICE AND WORKPIECE RETENTION METHOD

RELATED APPLICATIONS

The present application is a National Phase of International Application Number PCT/JP2017/021178 filed Jun. 7, 2017 and claims priority to Japanese Application Number 2016-138736 filed Jul. 13, 2016.

TECHNICAL FIELD

The present invention relates to a workpiece retention device and a workpiece retention method for retaining a workpiece.

BACKGROUND ART

One of structural components of aircrafts has a frame. In order to finish the frame into a predetermined shape in manufacturing the frame, it is necessary to carry out cutting work and drilling work. The frame is a thin plate component. Accordingly, it is necessary to clamp the vicinity of a work spot in order to suppress vibration during the work. However, the frame has many workpiece types having mutually different curvatures and cross sectional shapes. Consequently, it is difficult to prepare a clamp jig corresponding to each type. Therefore, a clamp device is known which clamps airframe components of the aircrafts as disclosed in PTL 1 (for example, refer to PTL 1). The clamp device has a plurality of slide blocks which slide forward and rearward on a slide surface in accordance with a curved shape of a target component installed on a workbench. In addition, each slide block is internally equipped with a slide cylinder, and a tip portion of the slide cylinder has a clamp cylinder for clamping a side surface and a bottom surface of the target component. When the machining work is carried out for a clamp portion of the clamped component, the clamp device releases a clamp used by the clamp cylinder, and causes the slide cylinder to move rearward.

CITATION LIST

Patent Literature

[PTL 1] Japanese Unexamined Patent Application Publication No. 5-31836

SUMMARY OF INVENTION

Technical Problem

However, according to the clamp device disclosed in PTL 1, the clamp is released when the machining work is carried out for the workpiece such as the component. Accordingly, it is necessary to carry out work for attaching and detaching the clamp when the machining work is carried out. Therefore, work efficiency is degraded when the machining work is carried out for the workpiece. In addition, according to PTL 1, the machining work is carried out for the workpiece in a state where the clamp is released. Consequently, there is a possibility that the workpiece may vibrate when the machining work is carried out, thereby causing a possibility that the work cannot be preferably carried out due to the vibration.

Therefore, the present invention aims to provide a workpiece retention device and a workpiece retention method which can preferably retain a workpiece without attaching and detaching the workpiece during work.

Solution to Problem

According to the present invention, there is provided a workpiece retention device for retaining a workpiece which is disposed so as to extend in a longitudinal direction, which has a workpiece main body extending in a height direction in a cross section orthogonal to the longitudinal direction, a first flange disposed on one side of the workpiece main body in the height direction, and a second flange disposed on the other side of the workpiece main body in the height direction, in which the first flange is disposed so as to protrude to one side in a width direction orthogonal to the height direction and the second flange is disposed so as to protrude to the other side in the width direction. The workpiece retention device includes a plurality of grippers disposed side by side in the longitudinal direction of the workpiece, and a gripper movement mechanism for moving the plurality of grippers in accordance with a design shape of the workpiece. The gripper has a base block to be connected to the gripper movement mechanism, a workpiece support member disposed in the base block so as to receive and support the second flange of the workpiece, a movement block disposed between the base block and the first flange of the workpiece so as to be movable toward the first flange of the workpiece supported by the workpiece support member, a block movement mechanism for moving the movement block relative to the base block, and a suction mechanism disposed in the movement block so as to suction the workpiece main body on the first flange side.

In addition, according to the present invention, there is provided a workpiece retention method for causing the above-described workpiece retention device to retain the workpiece. The workpiece retention method includes a preparation step of causing the gripper movement mechanism to move the plurality of grippers in accordance with a design shape of the workpiece, a workpiece attachment step of installing the workpiece in the workpiece support member of each of the plurality of grippers, a gripper movement step of causing the block movement mechanism to move the movement block relative to the base block, toward the first flange of the workpiece supported by the workpiece support member, and a suction step of causing the suction mechanism disposed in the movement block to suction the workpiece main body on the first flange side.

According to these configurations, the suction mechanism can suction the workpiece main body on the first flange, in a state where the movement block is moved to the first flange side in accordance with a distance between the first flange and the second flange which varies depending on each workpiece. Therefore, in a case where the work is carried out for the workpiece, the work can be carried out for the workpiece from a side which is not suctioned by the suction mechanism. Accordingly, the workpiece can be preferably retained without releasing the suctioned workpiece. The work can be preferably carried out for the workpiece, and degradation of work efficiency can be suppressed. In addition, when the work is carried out for the first flange, the workpiece main body on the first flange is suctioned. In this manner, it is possible to shorten a distance from a suction position to a work point for the first flange. Accordingly, vibration of the first flange can be suppressed. Therefore, the work can be preferably carried out for the first flange of the workpiece.

In addition, it is preferable that the workpiece retention device further includes a clamp mechanism for clamping the second flange of the workpiece.

In addition, it is preferable that the workpiece retention method further includes a clamping step of causing the clamp mechanism disposed in the base block to clamp the second flange after the suction step, in a case where the workpiece retention device includes the clamp mechanism for clamping the second flange of the workpiece.

According to this configuration, the second flange can be clamped by the clamp mechanism. Accordingly, vibration of the second flange can be suppressed when work is carried out for the second flange. Therefore, the work can be preferably carried out for the second flange. In addition, in a case where an angle formed between the workpiece main body and the second flange is a right angle in the design shape of the workpiece, the second flange is clamped by the clamp mechanism. In this manner, a direct angle error between the workpiece main body and the second flange can be corrected.

In addition, it is preferable that the workpiece has at least two positioning holes formed in both end portions in the longitudinal direction, that the workpiece retention device further includes at least two workpiece fixing portions disposed in both end portions of the workpiece to be retained in the longitudinal direction so as to position and fix the workpiece, and that each of the workpiece fixing portions has a fixing block, and a positioning member disposed in the fixing block so as to be inserted into the positioning hole of the workpiece.

According to this configuration, each positioning member of the workpiece fixing portion is inserted into each positioning hole of the workpiece. In this manner, it is possible to fix both end portions of the workpiece in the longitudinal direction.

In addition, it is preferable that the gripper further has a vibration proof material disposed in an abutment portion of the movement block abutting against the first flange so as to suppress vibration of the first flange.

According to this configuration, the vibration of the first flange can be further suppressed by the vibration proof material. Therefore, the work can be more preferably carried out for the first flange of the workpiece. For example, the vibration proof material includes vibration proof rubber.

In addition, it is preferable that the gripper movement mechanism has a horizontal movement mechanism for horizontally moving the gripper, and a vertical movement mechanism for vertically moving the gripper.

According to this configuration, the gripper can be moved in a horizontal direction and a vertical direction by the horizontal movement mechanism and the vertical movement mechanism.

In addition, it is preferable that the gripper movement mechanism further has a turning mechanism for turning the base block in a plane including the longitudinal direction and the height direction of the workpiece.

According to this configuration, the gripper can be turned in a plane including the longitudinal direction and the height direction by the turning mechanism. Therefore, even in a case where the workpiece is curved in the longitudinal direction, the gripper can be properly moved in accordance with the shape of the workpiece, and the workpiece can be reliably gripped by the gripper.

In addition, it is preferable that the gripper movement mechanism has a radial movement mechanism for radially moving the plurality of grippers.

According to this configuration, in a case where the workpiece is curved in the longitudinal direction, the plurality of grippers are radially moved by the radial movement mechanism. In this manner, the plurality of grippers can be moved in accordance with the shape of the curved workpiece in the longitudinal direction.

In addition, it is preferable that a plurality of the workpiece support members are disposed along the longitudinal direction of the workpiece.

According to this configuration, the workpiece support members disposed in the base block are disposed side by side in the longitudinal direction. In this manner, a distance between points supported by the grippers adjacent to each other in the longitudinal direction of the workpiece can be shortened. That is, in a case where one workpiece support member is provided, the distance between the grippers and the distance between the workpiece support members are substantially the same as each other. On the other hand, in a case where the plurality of workpiece support members are disposed side by side, the distance between the right side workpiece support member disposed on the left side gripper and the left side workpiece support member disposed on the right side gripper is narrowed compared to the case where one workpiece support member is provided. Accordingly, the distance between the points for supporting the workpiece can be shortened. Therefore, a load applied to the workpiece can be reduced, and the vibration can be suppressed when the work is carried out for the workpiece.

DESCRIPTION OF EMBODIMENTS

Hereinafter, embodiments according to the present invention will be described in detail with reference to the drawings. The present invention is not limited by the embodiments. In addition, configuration elements in the following embodiments include elements which can be easily substituted by those skilled in the art or substantially the same elements. Furthermore, the configuration elements described below can be appropriately combined with each other. In addition, in a case where the present invention adopts a plurality of embodiments, the respective embodiments can be combined with each other.

Embodiment 1

Figure 1:
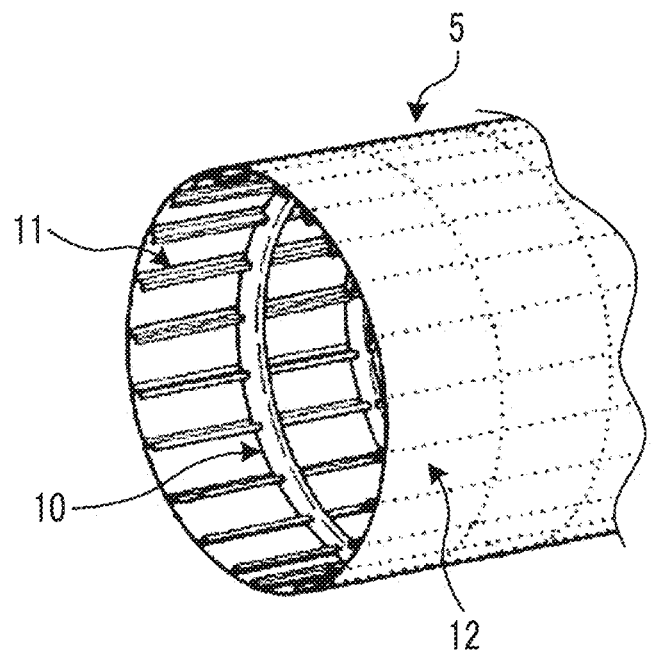
FIG. 1 is a perspective view of a casing including a frame serving as a workpiece to be retained by a workpiece retention device according to Embodiment 1.
Figure 2:
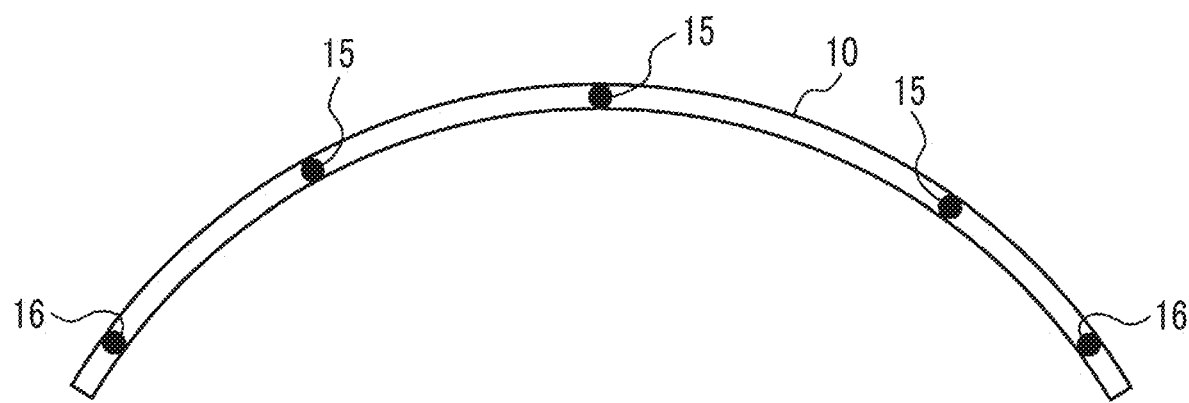
FIG. 2 is a front view of the frame.
Figure 3:
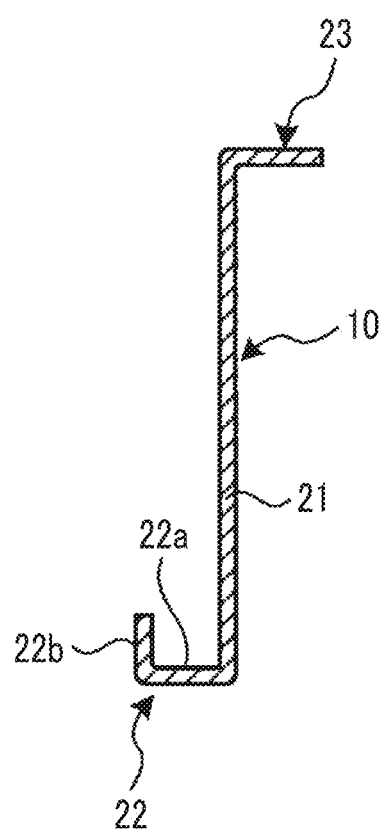
FIG. 3 is a sectional view of the frame.
Figure 4:
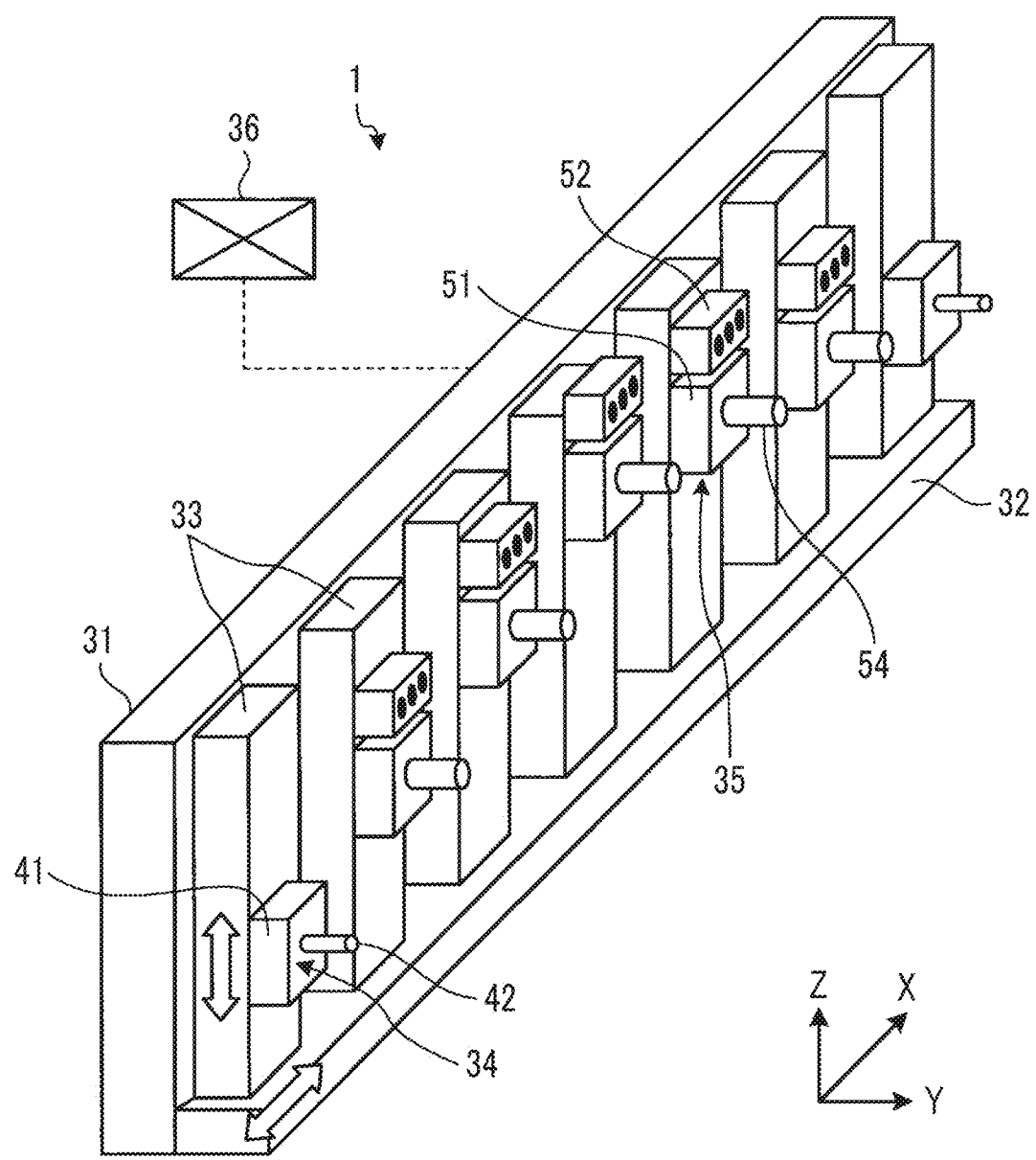
FIG. 4 is a schematic view schematically illustrating the workpiece retention device according to Embodiment 1.
Figure 5:
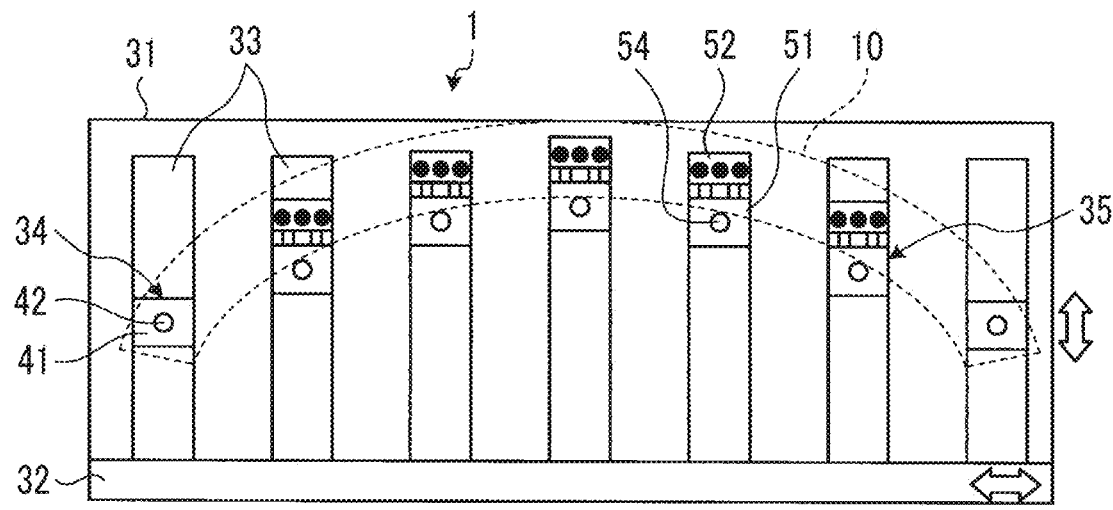
FIG. 5 is a schematic view when the workpiece retention device according to Embodiment 1 is viewed from a side surface.
Figure 6:
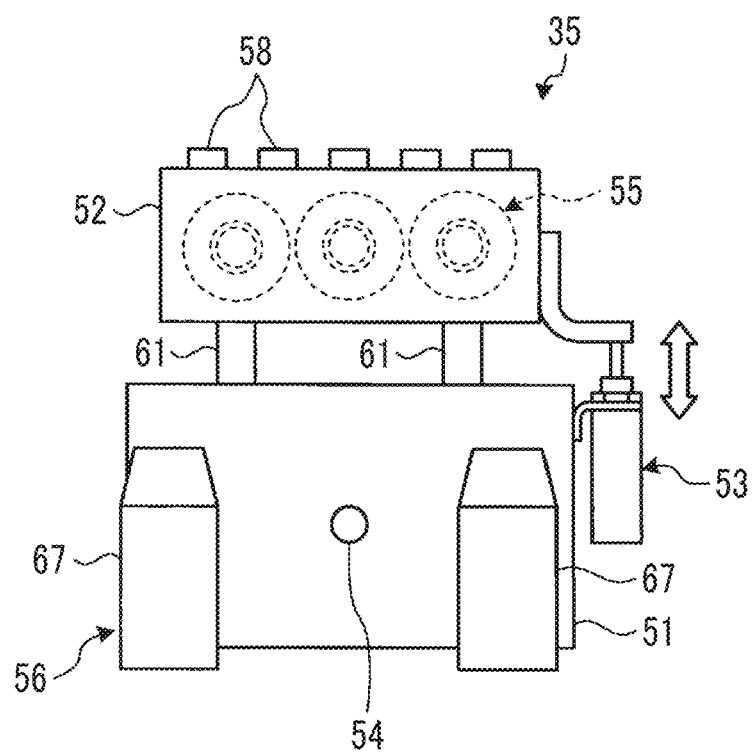
FIG. 6 is a side view of a gripper.
Figure 7:
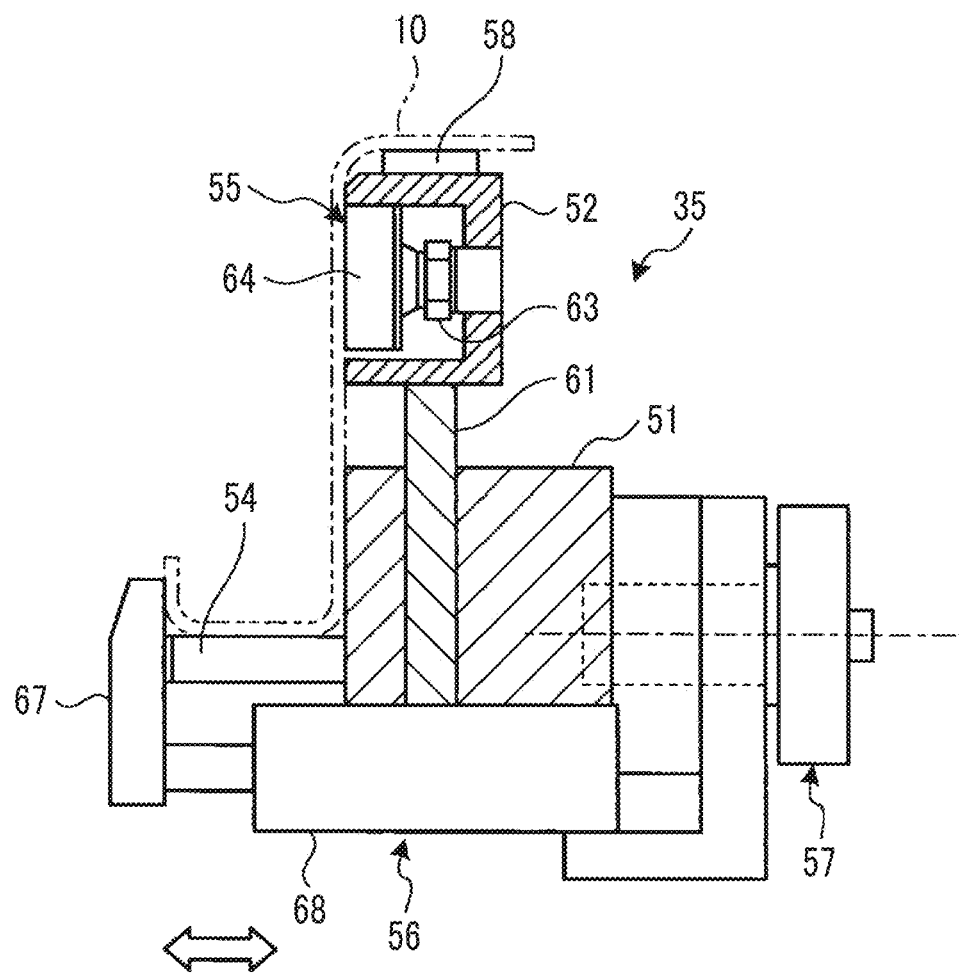
FIG. 7 is a sectional view of the gripper.
Figure 8:
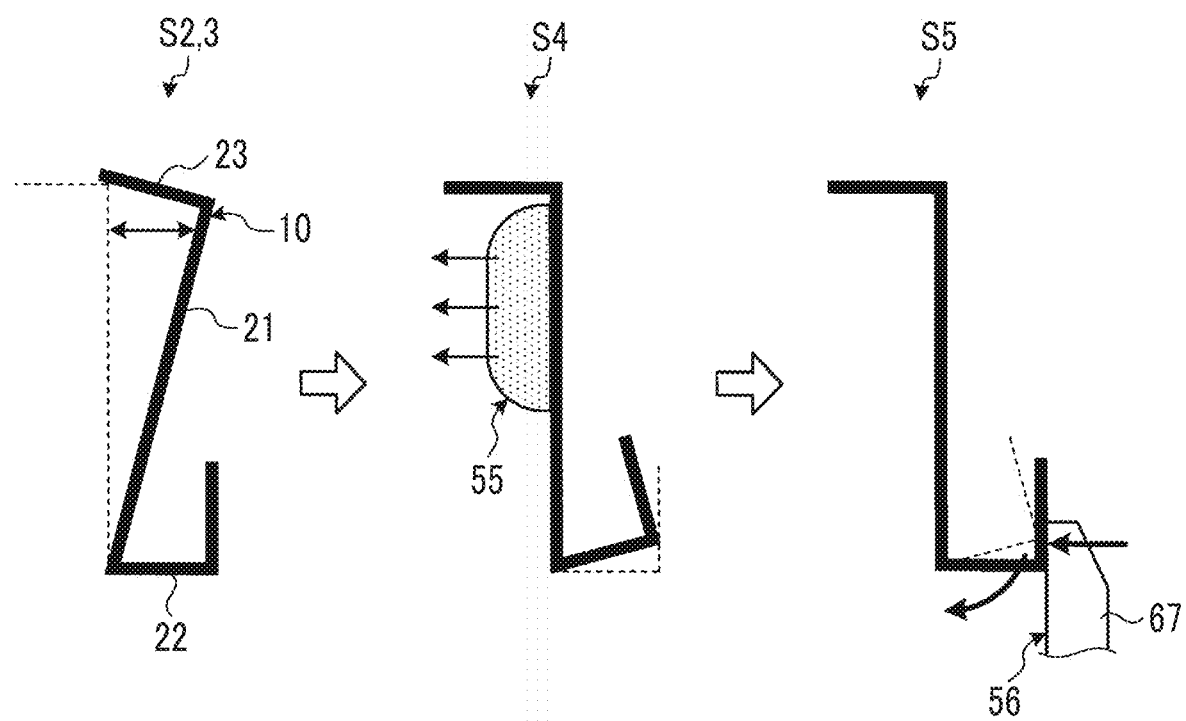
FIG. 8 is a view for describing an example of an operation relating to a workpiece retention method according to Embodiment 1.
Figure 9:
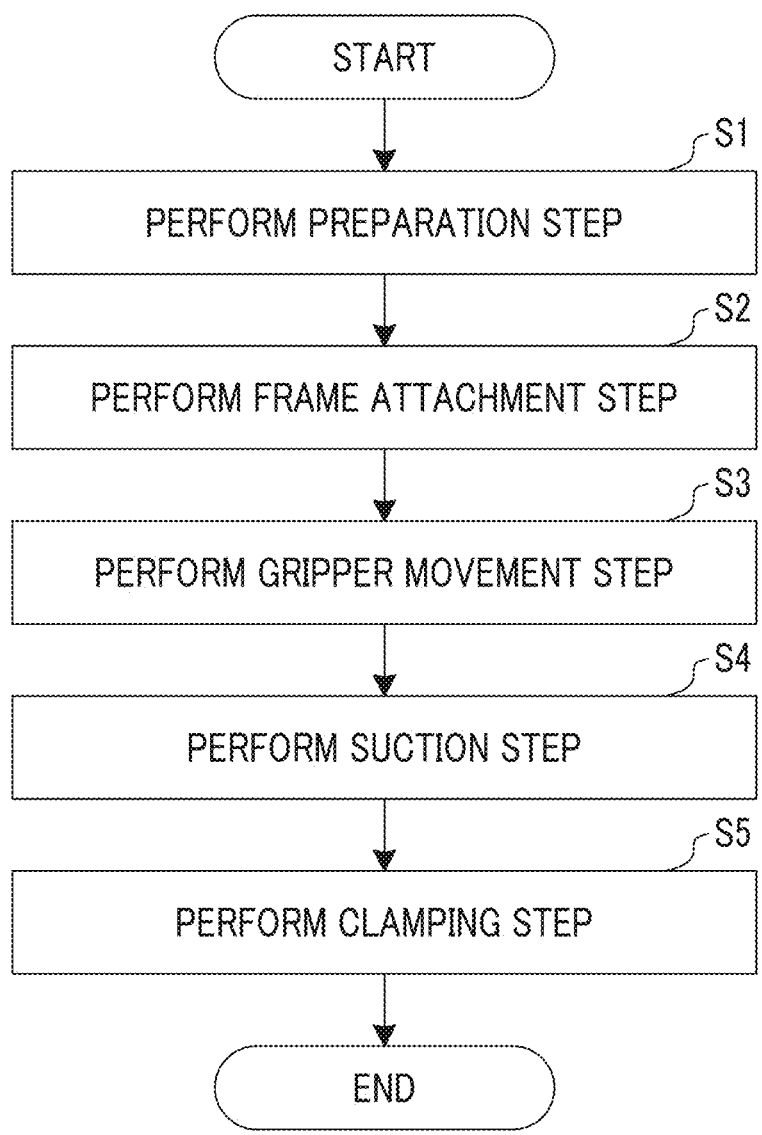
FIG. 9 is a flowchart illustrating an example of the operation relating to the workpiece retention method according to Embodiment 1.

FIG. 1 is a perspective view of a casing including a frame serving as a workpiece retained in a workpiece retention device according to Embodiment 1. FIG. 2 is a front view of the frame. FIG. 3 is a sectional view of the frame. FIG. 4 is a schematic view schematically illustrating the workpiece retention device according to Embodiment 1. FIG. 5 is a schematic view when the workpiece retention device according to Embodiment 1 is viewed from a side surface. FIG. 6 is a side view of a gripper. FIG. 7 is a sectional view of the gripper. FIG. 8 is a view for describing an example of an operation relating to a workpiece retention method according to Embodiment 1. FIG. 9 is a flowchart illustrating an example of the operation relating to the workpiece retention method according to Embodiment 1.

A workpiece retention device 1 according to the present embodiment retains a workpiece serving as a work target. For example, the workpiece includes an aircraft component to be disposed in an aircraft, and specifically, includes an arch-shaped frame 10 which is a structural member of an airframe of the aircraft. In the present embodiment, an example will be described in which the workpiece is applied to the frame 10. However, the present invention is not limited thereto. For example, without being limited to the aircraft component of the aircraft, the present invention may be applied to any workpiece serving as the work target. Prior to the description of the workpiece retention device 1, the frame 10 serving as the work target will be first described.

As illustrated in FIG. 1, the frame 10 is disposed in a casing 5 of the airframe of the aircraft. That is, the casing 5 is configured to include the frame 10, a stringer 11, and a skin panel 12. The casing 5 is formed in a cylindrical shape which is elongated in an axial direction. A plurality of arch-shaped frames 10 are disposed side by side along a circumferential direction centered on the axial direction of the casing 5, thereby forming annular frames. The annular frames are disposed side by side at a predetermined interval in the axial direction of the casing 5. The stringer 11 is disposed between the frames 10 disposed side by side while being adjacent to each other in the axial direction, and is disposed to extend in the axial direction of the casing 5. The stringers 11 are disposed side by side at a predetermined interval in the circumferential direction of the casing 5. The skin panel 12 serves as an outer panel of the casing 5, is disposed outside the frame 10 and the stringer 11, and is curved along an outer peripheral surface of the casing 5 having a cylindrical shape.

Next, the frame 10 will be described with reference to FIGS. 2 and 3. As illustrated in FIG. 2, the frame 10 is formed to extend in a longitudinal direction (circumferential direction of the casing 5), and has an arch shape having a different radius of curvature in the longitudinal direction in accordance with a predetermined shape of each portion of the casing. In a case where the frame 10 is retained by the workpiece retention device 1, a central portion in the longitudinal direction is located on an upper side in a vertical direction, and both end portions in the longitudinal direction are located on a lower side in the vertical direction. Accordingly, an outer peripheral side of the frame 10 is located on the upper side in the vertical direction, and an inner peripheral side thereof is located on the lower side in the vertical direction. In machining work using the workpiece retention device 1 (to be described later), in the frame 10, keyholes 15 are formed at several locations in the central portion in the longitudinal direction. In addition, in the frame 10, tool holes 16 are respectively formed in advance in both end portions in the longitudinal direction. The tool hole 16 is a positioning hole used when being attached to the workpiece retention device 1 (to be described later).

As illustrated in FIG. 3, the frame 10 has a frame main body (workpiece main body) 21, a lip flange (second flange) 22 disposed on an inner peripheral side (lower side in FIG. 3) of the frame main body 21, and a base flange (first flange) 23 disposed on an outer peripheral side (upper side in FIG. 3) of the frame main body 21. The frame main body 21, the lip flange 22, and the base flange 23 are integrated with one another.

The frame main body 21 is a plate-shaped portion disposed from the inner peripheral side to the outer peripheral side of the frame 10. The keyhole 15 and the tool hole 16 are formed to penetrate the frame main body 21 in a thickness direction.

The lip flange 22 is disposed to protrude from an end portion on the inner peripheral side of the frame main body 21 to one side (left side in FIG. 3) in a width direction orthogonal to a height direction in which the frame main body 21 extends. In a cross section illustrated in FIG. 3, the lip flange 22 is disposed to be orthogonal to the frame main body 21. The lip flange 22 includes a portion 22a protruding from the frame main body 21 and a portion 22b protruding from a tip portion in a protruding direction of the portion 22a to the outer peripheral side of the frame 10, and is formed to be bent in an L-shape.

The base flange 23 is disposed to protrude from an end portion on the outer peripheral side of the frame main body 21 to the other side (right side in FIG. 3) in the width direction orthogonal to the height direction of the frame main body 21. In the cross section illustrated in FIG. 3, the base flange 23 is disposed to be orthogonal to the frame main body 21.

In this way, a cross section of the above-described frame 10 is formed in a Z-shape by the frame main body 21, the lip flange 22 and the base flange 23. Then, in the frame 10, trimming is performed on the lip flange 22 and the base flange 23, or drilling is performed on the frame main body 21. A width of the lip flange 22, the base flange 23, and the frame main body 21, and a plate thickness of the frame main body 21 vary depending on each workpiece. There are many types of the workpiece. Processing is not particularly limited to trimming and drilling.

Next, the workpiece retention device 1 for retaining the frame 10 in FIGS. 2 and 3 will be described with reference to FIGS. 4 to 9.

As illustrated in FIGS. 4 and 5, the workpiece retention device 1 includes a device frame 31, a horizontal movement mechanism 32, a vertical movement mechanism 33, two workpiece fixing portions 34, a plurality of grippers 35, and a control unit 36. The device frame 31 is installed on an installation surface, and each mechanism is attached thereto.

The horizontal movement mechanism 32 is attached to a lower portion of the device frame 1, and the vertical movement mechanism 33 (to be described later) is installed so as to be movable in a horizontal direction (X-direction). The horizontal movement mechanism 32 is connected to the control unit 36, and the control unit 36 controls the movement in the horizontal direction of the vertical movement mechanism 33 moved by the horizontal movement mechanism 32.

The plurality of vertical movement mechanisms 33 are installed on the horizontal movement mechanism 32, and are disposed side by side in the horizontal direction. Out of the plurality of vertical movement mechanisms 33, two vertical movement mechanisms 33 and two workpiece fixing portions 34 are respectively disposed on both sides in the horizontal direction. In addition, out of the plurality of the vertical movement mechanisms 33, the remaining plurality of vertical movement mechanisms 33 between the two vertical movement mechanisms 33 having the workpiece fixing portion 34 are provided with the plurality of grippers 35. The gripper 35 may also serve as the workpiece fixing portion 34 through component replacement of the gripper 35. Each of the vertical movement mechanisms 33 is installed so that the workpiece fixing portion 34 or the gripper 35 can move in a vertical direction (Z-direction). Here, in the plurality of vertical movement mechanisms 33, the vertical movement mechanism disposed at the center in the horizontal direction is fixed, and the fixed vertical movement mechanism 33 is used as a reference. Then, the vertical movement mechanism 33 on both sides of the fixed vertical movement mechanism 33 moves in the horizontal direction with reference to the fixed vertical movement mechanism 33.

In this way, the horizontal movement mechanism 32 and the vertical movement mechanism 33 function as a gripper movement mechanism for moving the plurality of grippers 35.

The two workpiece fixing portions 34 are disposed in the vertical movement mechanisms 33 on both sides in the horizontal direction. Accordingly, the two workpiece fixing portions 34 are disposed so as to be located in both end portions of the frame 10 in the longitudinal direction. The workpiece fixing portion 34 has a fixing block 41 installed on the vertical movement mechanism 33 and a locator pin (positioning member) 42 disposed in the fixing block 41. The fixing block 41 is movable on the vertical movement mechanism 33 in the vertical direction. The locator pin 42 is disposed to protrude from the inside of a plane including the horizontal direction and the vertical direction of the fixing block 41 in the Y-direction. Each locator pin 42 is inserted into the tool hole 16 of the frame 10. In this manner, both end portions of the frame 10 are positioned.

As illustrated in FIGS. 6 and 7, the plurality of grippers 35 are located between the two workpiece fixing portions 34. Each of the grippers 35 has a lower block 51, an upper block 52, a block movement mechanism 53, a workpiece support pin (workpiece support member) 54, a suction mechanism 55, a clamp mechanism 56, a turning mechanism 57, and a vibration proof rubber (vibration proof material) 58.

The lower block 51 serves as a base block installed on the vertical movement mechanism 33, and is movable on the vertical movement mechanism 33 in the vertical direction. In the lower block 51, a surface on one side in the Y-direction in which the frame 10 is installed serves as an abutment surface to which the frame main body 21 of the frame 10 comes into contact.

The upper block 52 is disposed above the lower block 51, and serves as a movement block movable in the vertical direction relative to the lower block 51. In the upper block 52, a surface on one side in the Y-direction in which the frame 10 is installed serves as an abutment surface with which the frame main body 21 of the frame 10 come into contact. Then, the abutment surface of the lower block 51 and the abutment surface of the upper block 52 are located in the same plane.

The block movement mechanism 53 is disposed on a side surface of the lower block 51 and the upper block 52, and is configured using a linear motion mechanism such as a cylinder, for example. The block movement mechanism 53 is connected to each of the lower block 51 and the upper block 52, and moves the upper block 52 by moving the upper block 52 forward to and rearward in the vertical direction from the lower block 51. In addition, a guide rod 61 is disposed to extend in the vertical direction between the lower block 51 and the upper block 52. The guide rod 61 is connected to the upper block 52, and is disposed to be movable in the vertical direction relative to the lower block 51. Therefore, the upper block 52 moves in the vertical direction relative to the lower block 51 while being guided by the guide rod 61.

The plurality of workpiece support pins 54 are disposed in the lower block 51, and are disposed side by side in the longitudinal direction of the frame 10 to be installed. The workpiece support pins 54 are formed in a cylindrical shape. Embodiment 1 employs two workpiece support pins 54. The two workpiece support pins 54 receive and support the lip flange 22 of the frame 10 in an upper portion thereof. The workpiece support pins 54 are disposed to protrude in the Y-direction from the inside of the abutment surface of the lower block 51.

The suction mechanism 55 suctions the frame 10 installed facing the abutment surface of the upper block 52, and brings the frame 10 into contact with the abutment surface of the upper block 52 so that the frame 10 is suctioned by and fixed to the upper block 52. The suction mechanism 55 has a plurality of suction nozzles 63 and a plurality of suction pads 64 respectively attached to tips of the plurality of suction nozzles 63. In Embodiment 1, the suction nozzles 63 and the suction pads 64 are disposed three by three, for example. The three suction nozzles 63 and the three suction pads 64 are disposed side by side in the longitudinal direction of the frame 10 to be installed in the workpiece support pin 54 of the lower block 51. Each of the suction nozzles 63 is disposed so that the tip reaches the inside of the upper block 52. Each of the suction pads 64 is attached to the tip of the suction nozzle 63 so as to be disposed from the inside of the upper block 52 to the abutment surface of the upper block 52. In this case, the suction pad 64 is disposed to slightly protrude from the abutment surface of the upper block 52.

The clamp mechanism 56 clamps the lip flange 22 of the frame 10 installed in the workpiece support pin 54 of the lower block 51. The clamp mechanism 56 is disposed on the lower side of the lower block 51. The clamp mechanism 56 has a claw portion 67 and a clamp movement mechanism 68 for moving the claw portion 67 in the width direction of the frame 10. The plurality of claw portions 67 are disposed side by side in the longitudinal direction of the frame 10 installed in the workpiece support pin 54. In Embodiment 1, for example, the number of the plurality of claw portions 67 are two. The two claw portions 67 are formed so as to be tapered upward in the height direction of the frame 10. The length of the claw portion 67 in the height direction is set so that the portion 22b of the lip flange 22 of the frame 10 installed in the workpiece support pin 54 protrudes. The clamp movement mechanism 68 is disposed on the lower side of the lower block 51, and is configured using a linear motion mechanism such as a cylinder, for example. The clamp movement mechanism 68 is connected to each of the lower block 51 and the claw portion 67, and moves the claw portion 67 forward to and rearward from the lower block 51 in the width direction of the frame 10. In this manner, the lip flange 22 of frame 10 is clamped and unclamped.

The turning mechanism 57 is disposed between the vertical movement mechanism 33 and the lower block 51, and turns all of the grippers 35 around the vertical movement mechanism 33. The turning mechanism 57 turns the lower block 51 around a turning axis extending in the Y-direction in a plane including the longitudinal direction and the height direction of the frame 10, that is, in a plane including a YX-direction and a Z-direction of the workpiece retention device 1. The turning mechanism 57 turns the gripper 35 so that the plurality of workpiece support pins 54 and the plurality of claw portions 67 are arranged in accordance with the shape of the frame 10 with respect to the arch-shaped frame 10.

The vibration proof rubber 58 is disposed in an abutment portion abutting against the base flange 23 of the upper block 52. The abutment portion is an upper surface of the upper block 52 in the vertical direction. The vibration proof rubber 58 is disposed in order to absorb the vibration generated by work when the work is carried out for the base flange 23. The vibration proof rubber 58 is formed in a rectangular shape, for example. The plurality of vibration proof rubbers 58 are disposed side by side in the longitudinal direction of the frame 10. Since the plurality of vibration proof rubbers 58 are disposed side by side, the vibration proof rubbers 58 are more likely to be crushed compared to a case where the vibration proof rubbers 58 are disposed on the entire upper surface of the upper block 52. Therefore, the vibration can be preferably absorbed.

The control unit 36 is connected to the horizontal movement mechanism 32, the vertical movement mechanism 33, and the gripper 35, and controls the operation of each portion. The control unit 36 moves each of the plurality of vertical movement mechanisms 33 to a predetermined position in the horizontal direction by controlling the horizontal movement mechanism 32. In addition, the control unit 36 moves each of the two workpiece fixing portions 34 and the plurality of grippers 35 to a predetermined position in the vertical direction by controlling each of the vertical movement mechanisms 33. Furthermore, the control unit 36 operates the grippers 35 by controlling each of the block movement mechanism 53, the suction mechanism 55, the clamp movement mechanism 68, and the turning mechanism 57 of the gripper 35. That is, the control unit 36 moves the upper block 52 in the vertical direction relative to the lower block 51 by controlling the block movement mechanism 53. In addition, the control unit 36 causes the upper block to suction the frame 10 by controlling the suction mechanism 55. In addition, the control unit 36 causes the lower block 51 to clamp the frame 10 by controlling the clamp movement mechanism 68. In addition, the control unit 36 turns all of the grippers 35 relative to the vertical movement mechanism 33 by controlling the turning mechanism 57.

Next, a series of operations for attaching the frame 10 serving as the workpiece to the above-described workpiece retention device 1 will be described with reference to FIGS. 8 and 9. First, the workpiece retention device 1 is prepared before the frame 10 is attached to the workpiece retention device 1 (Step S1: a preparation step). In the preparation step S1, the control unit 36 controls the movement of the horizontal movement mechanism 32 and the vertical movement mechanism 33, based on a design shape so that the frame 10 has a previously designed shape, and controls the turning movement of the turning mechanism 57. That is, in the preparation step S1, the horizontal movement mechanism 32, the vertical movement mechanism 33, and the turning mechanism 57 move the grippers 35 so that the workpiece support pin 54 of the plurality of grippers 35 is located at a position in accordance with the design shape of the frame 10. Specifically, in the preparation step S1, the plurality of vertical movement mechanisms 33 on both sides in the horizontal direction are moved in the horizontal direction with reference to the fixed vertical movement mechanism 33 at the center.

Subsequently, both end portions of the frame 10 in the longitudinal direction are attached to the two workpiece fixing portions 34, and the frame 10 between the two workpiece fixing portions 34 is installed on the plurality of grippers 35 (Step S2: a frame attachment step (workpiece attachment step)). Specifically, in the frame attachment step S2, the locator pin 42 is inserted into the tool hole 16 on one side of the frame 10 in the longitudinal direction, thereby positioning one side of the frame 10. Then, while a central portion of the lip flange 22 of the frame 10 in the longitudinal direction is installed on the workpiece support pin 54 of the plurality of grippers 35, the locator pin 42 is inserted into the tool hole 16 on the other side of the frame 10 in the longitudinal direction. In this manner, the frame 10 is attached to the workpiece retention device 1.

Thereafter, the control unit 36 controls the block movement mechanism 53 of the gripper 35 so that the upper block 52 is raised upward in the vertical direction relative to the lower block 51 of the gripper 35 and the upper block 52 abuts against the base flange 23 of the frame 10 (Step S3: a gripper movement step). In this manner, the control unit 36 positions the upper block 52 in the vicinity of the base flange 23 of the frame 10, and causes the vibration proof rubber 58 of the upper block 52 to collide with the lower surface of the base flange 23.

In this way, in some cases, the frame 10 attached to the workpiece retention device 1 through Step S1 to Step S3 is brought into a state where the frame main body 21 on the base flange 23 side slightly floats from the upper block 52 as illustrated in the left side drawing in FIG. 8. FIG. 8 illustrates the floating of the frame 10 in an exaggerated manner.

The control unit 36 controls the suction mechanism 55 of the gripper 35 so that the frame main body 21 of the frame 10 installed on the workpiece support pin 54 of each of the grippers 35 is suctioned by the upper block 52 (Step S4: a suction step). If Step S4 is performed, in some cases, the frame 10 is brought into a state illustrated in the central drawing in FIG. 8 from a state illustrated in the left side drawing in FIG. 8. That is, if the frame 10 is suctioned by the upper block 52 and the frame main body 21 no longer floats from the upper block 52, in some cases, the lip flange 22 of the frame 10 is brought into a state of slightly floating from the workpiece support pin 54.

The control unit 36 controls the clamp movement mechanism 68 of the gripper 35 to move the claw portion 67 so as to retract to the lower block 51 side. In this manner, the lip flange 22 of frame 10 installed on the workpiece support pin 54 is clamped by the lower block 51 (Step S5: a clamping step). If Step S5 is performed, the frame 10 is brought into a state illustrated in the right side drawing in FIG. 8 from a state illustrated in the central drawing in FIG. 8. That is, the frame 10 is clamped by the lower block 51. Accordingly, the lip flange 22 no longer floats from the workpiece support pin 54. In this case, in the frame 10, the lip flange 22 is clamped by the clamp mechanism 56. In this manner, a direct angle error is corrected so that an angle formed by the frame main body 21 and the lip flange 22 becomes a right angle.

In this way, the above-described processes in Step S1 to Step S5 are performed. Accordingly, the frame 10 is retained by the workpiece retention device 1 in accordance with the design shape of the frame 10. In the frame 10 retained by the workpiece retention device 1, the work is appropriately carried out for the frame main body 21, the lip flange 22, and the base flange 23.

As described above, according to Embodiment 1, in a state where the upper block 52 is moved to the base flange 23 side, the workpiece main body 21 on the base flange 23 side can be suctioned by the suction mechanism 55 of the gripper 35. Therefore, in a case where the work is carried out for the frame 10, the work can be carried out for the frame 10 from a side which is not suctioned by the suction mechanism 55. Accordingly, the frame 10 can be preferably retained processed without releasing the suctioned frame 10. Therefore, the work for the frame 10 can be preferably carried out, and it is possible to suppress inefficiency in the work. In addition, when the work is carried out for the base flange 23, the workpiece main body 21 on the base flange 23 side is suctioned. In this manner, the distance from the suction position to the work point for the base flange 23 can be shortened. Accordingly, the vibration of the base flange 23 can be suppressed. Therefore, the work for the base flange 23 can be preferably carried out.

According to Embodiment 1, the lip flange 22 can be clamped by the clamp mechanism 56. Accordingly, the vibration of the lip flange 22 can be suppressed when the work is carried out for the lip flange 22. Therefore, the work for the lip flange 22 can be preferably carried out. In addition, the lip flange 22 is clamped by the clamp mechanism 56. In this manner, it is possible to correct the direct angle error between the frame main body 21 and the lip flange 22.

In addition, according to Embodiment 1, both end portions of the frame 10 in the longitudinal direction can be fixed by inserting the locator pin 42 of the workpiece fixing portion 34 into each of the tool holes 16 of the frame 10.

In addition, according to Embodiment 1, the vibration of the base flange 23 can be further suppressed by the vibration proof rubber 58. Accordingly, the work for the base flange 23 of the frame 10 to can be more preferably carried out. The vibration proof rubber 58 is applied to Embodiment 1. However, any vibration proof material may be used as long as the vibration can be suppressed.

In addition, according to Embodiment 1, the gripper 35 can be turned by the turning mechanism 57 while the gripper 35 is moved in the horizontal direction and the vertical direction by the horizontal movement mechanism 32 and the vertical movement mechanism 33. Therefore, even in a case where the workpiece is curved in the longitudinal direction, the gripper can be properly moved in accordance with the shape of the frame 10, and the frame 10 can be reliably gripped by the gripper 35.

In addition, according to Embodiment 1, the plurality of workpiece support pins 54 are disposed side by side in the lower block 51 along the longitudinal direction of the frame 10. In this manner, the distance between the points supported by the grippers 35 adjacent to each other in the longitudinal direction of the frame 10 can be narrowed. That is, it is possible to shorten the distance between the workpiece support pin 54 disposed in one gripper 35 and the workpiece support pin 54 disposed in the other adjacent gripper 35. Therefore, the load applied to the frame 10 can be reduced, and the vibration caused by the work can be suppressed.

In addition, according to Embodiment 1, the plurality of grippers 35 are disposed side by side along the longitudinal direction of the frame 10. In this manner, it is possible to narrow the distance between the grippers 35 adjacent to each other in the longitudinal direction of the frame 10, and the vibration caused by the work for the frame 10 can be suppressed.

In addition, in Embodiment 1, in the preparation step S1, after the gripper 35 is moved to the predetermined position, the frame 10 is attached to the workpiece retention device 1 in the frame attachment step S2. Alternatively, after the frame 10 is attached to the frame fixing portion 34 of the workpiece retention device 1, the gripper 35 may be moved to the predetermined position.

In addition, in Embodiment 1, the lip flange 22 of the frame 10 is installed in the workpiece support pin 54. Alternatively, the base flange 23 of the frame 10 may be installed in the workpiece support pin 54.

Embodiment 2

Figure 10:
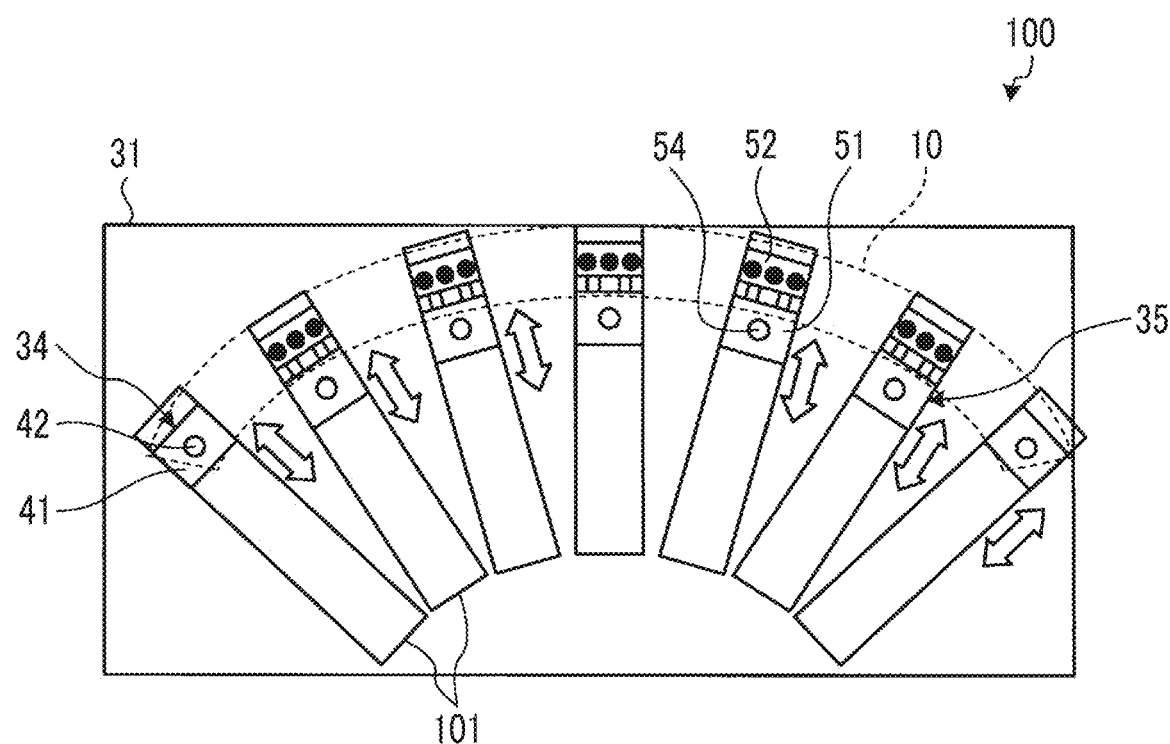
FIG. 10 is a schematic view when a workpiece retention device according to Embodiment 2 is viewed from a side surface.

Next, referring to FIG. 10, a workpiece retention device 100 according to Embodiment 2 will be described. FIG. 10 is a schematic view when the workpiece retention device according to Embodiment 2 is viewed from a side surface. In Embodiment 2, in order to avoid repeated description in Embodiment 1, only different elements will be described, and the same reference numerals will be given to the same configurations.

The workpiece retention device 100 according to Embodiment 2 has a radial movement mechanism 101 instead of the horizontal movement mechanism 32 and the vertical movement mechanism 33 according to Embodiment 1. The radial movement mechanism 101 is attached to the device frame 1, and a plurality of the radial movement mechanisms 101 are disposed so as to radially move the plurality of grippers 35. The plurality of radial movement mechanisms 101 are disposed side by side at a predetermined angle in the circumferential direction (with different phases) as a center of a radius of curvature of the frame 10 to be installed. Then, the plurality of radial movement mechanisms 101 are radially extended in a radial direction from the center of the radius of curvature of the frame 10. The plurality of radial movement mechanisms 101 are connected to the control unit 36, and the control unit 36 controls the radial movement mechanism 101 so as to move the gripper 35 in the radial direction.

In Embodiment 2, in the preparation step S1, the control unit 36 controls movement of the plurality of radial movement mechanisms 101, based on the design shape, so that the frame 10 has the previously designed. The grippers 35 are moved by the plurality of radial movement mechanisms 101 so that the workpiece support pin 54 of the plurality of grippers 35 is located at a position in accordance with the design shape of the frame 10.

As described above, according to Embodiment 2, in a case where the frame 10 is curved in the longitudinal direction, the plurality of grippers 35 are radially moved by the plurality of radial movement mechanisms 101. In this manner, the plurality of grippers 35 can be moved in accordance with the shape of the curved frame 10 in the longitudinal direction.

Embodiment 3

Figure 11:
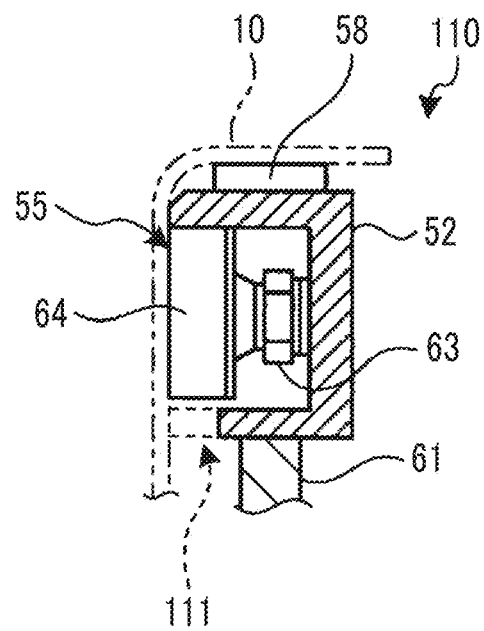
FIG. 11 is a sectional view illustrating a portion of a gripper of a workpiece retention device according to Embodiment 3.

Next, referring to FIG. 11, a workpiece retention device 110 according to Embodiment 3 will be described. FIG. 11 is a sectional view illustrating a portion of the gripper of the workpiece retention device according to Embodiment 3. In Embodiment 3, in order to avoid repeated description in Embodiments 1 and 2, only different elements will be described, and the same reference numerals will be given to the same configurations.

The workpiece retention device 110 according to Embodiment 3 is configured so that a retreat space 111 is formed in a portion of the upper block 52 of the gripper 35 according to Embodiment 1. In a case where the work is carried out for a portion of the frame 10 retained by the gripper 35, the retreat space 111 serves as a space where a work tool can retreat so that the work tool used for the work does not physically interfere with the upper block 52. The retreat space 111 may be formed at any location as long as the frame 10 is not hindered from being suctioned by the suction mechanism 55. In addition, without being limited to the upper block 52, the retreat space 111 may be formed in the lower block 51.

As described above, according to Embodiment 3, the work tool can retreat to the retreat space 111 of the gripper when the work is carried out for the frame 10. Accordingly, the work tool and the gripper 35 do not physically interfere with each other. Therefore, the work can be preferably carried out for the frame 10.

Embodiment 4

Figure 12:
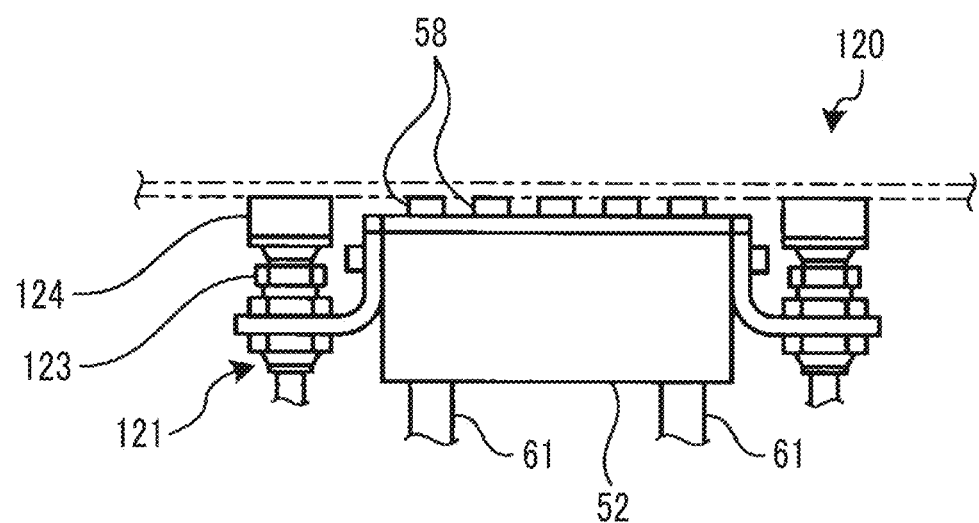
FIG. 12 is a side view illustrating a portion of a gripper of a workpiece retention device according to Embodiment 4.

Next, referring to FIG. 12, a workpiece retention device 120 according to Embodiment 4 will be described. FIG. 12 is a side view illustrating a portion of the gripper of the workpiece retention device according to Embodiment 4. In Embodiment 4, in order to avoid repeated description in Embodiments 1 to 3, only different elements will be described, and the same reference numerals will be given to the same configurations.

The workpiece retention device 120 according to Embodiment 4 further has an upper suction mechanism 121 in the gripper 35 according to Embodiment 1. The upper suction mechanisms 121 are respectively disposed on both side surfaces of the upper block 52 in the YX-direction (longitudinal direction of the frame 10), and suction the base flange 23 of the frame 10 so that the base flange 23 is suctioned by and fixed to the upper surface of the upper block 52. Each of the upper suction mechanisms 121 has a suction nozzle 123 and a suction pad 124 attached to each tip of the suction nozzle 123. The suction nozzle 123 is located upward of the upper block 52 in the vertical direction, and the tip of the suction nozzle 123 is located below the upper surface of the upper block 52. The suction pad 124 is attached to the tip of the suction nozzle 123, and is disposed to slightly protrude from the upper surface of the upper block 52.

As described above, according to Embodiment 4, in addition to the suction mechanism 55, the upper suction mechanism 121 can suction and fix the base flange 23 of the frame 10. Accordingly, the vibration proof rubber 58 can reliably abut against the base flange 23. Therefore, the vibration generated by carrying out the work for the base flange 23 can be more preferably suppressed, and the work for the base flange 23 can be more preferably carried out.

REFERENCE SIGNS LIST

1: workpiece retention device
5: casing
10: frame
11: stringer
12: skin panel
15: keyhole
16: tool hole
21: frame main body
22: lip flange
23: base flange
31: device frame
32: horizontal movement mechanism
33: vertical movement mechanism
34: workpiece fixing portion
35: gripper
36: control unit
41: fixing block
42: locator pin
51: lower block
52: upper block
53: block movement mechanism
54: workpiece support pin
55: suction mechanism
56: clamp mechanism
57: turning mechanism
58: vibration proof rubber
61: guide rod
63: suction nozzle
64: suction pad
67: claw portion
68: clamp movement mechanism
100: workpiece retention device (Embodiment 2)
101: radial movement mechanism
110: workpiece retention device (Embodiment 3)
111: retreat space
120: workpiece retention device (Embodiment 4)
121: upper suction mechanism
123: suction nozzle
124: suction pad

The invention claimed is:

1. A workpiece retention device for retaining a workpiece which is curved along a longitudinal direction and has a cross section orthogonal to the longitudinal direction including a Z-shape formed, which has workpiece main body extending in a height direction in the cross section orthogonal to the longitudinal direction, a first flange disposed on one side of the workpiece main body in the height direction, and a second flange disposed on the other side of the workpiece main body in the height direction, in which the first flange is disposed so as to protrude to one side in a width direction orthogonal to the height direction and the second flange is disposed so as to protrude to the other side in the width direction, the workpiece retention device comprising:
    a plurality of grippers disposed side by side in a horizontal direction of the workpiece retention device so as to be disposed along the longitudinal direction of the workpiece to be retained by the workpiece retention device; and
    a gripper movement mechanism for moving the plurality of grippers in accordance with a design shape of the workpiece,
    wherein each gripper has
        a base block to be connected to the gripper movement mechanism,
        a workpiece support member disposed in the base block and configured to receive and support the second flange of the workpiece when the workpiece is placed on the workpiece retention device such that the longitudinal direction of the workpiece extends in the horizontal direction of the workpiece retention device and the height direction of the workpiece extends in a vertical direction of the workpiece retention device, a movement block disposed above the base block so as to be movable forward and rearward relative to the base block so as to be movable toward the first flange of the workpiece having the second flange supported by the workpiece support member, a block movement mechanism for moving the movement block relative to the base block, and a suction mechanism disposed in the movement block and configured to suction the workpiece main body on the first flange side while the second flange of the workpiece is supported by the workpiece support member, wherein the respective workpiece support members of the plurality of grippers are arranged to conform to a shape of the curved workpiece to receive and support the second flange of the workpiece.

2. The workpiece retention device according to claim 1, further comprising:
a clamp mechanism for clamping the second flange of the workpiece.

3. The workpiece retention device according to claim 1, wherein the workpiece has at least two positioning holes formed in both end portions in the longitudinal direction, wherein the workpiece retention device further comprises at least two workpiece fixing portions disposed in the both end portions of the workpiece to be retained in the longitudinal direction so as to position and fix the workpiece, and wherein each of the workpiece fixing portions has
a fixing block, and
a positioning member disposed in the fixing block so as to be inserted into the positioning hole of the workpiece.

4. The workpiece retention device according to claim 1, wherein the gripper further has a vibration proof material disposed in an abutment portion of the movement block abutting against the first flange so as to suppress vibration of the first flange.

5. The workpiece retention device according to claim 1, wherein the gripper movement mechanism has
a horizontal movement mechanism for horizontally moving the gripper, and
a vertical movement mechanism for vertically moving the gripper.

6. The workpiece retention device according to claim 5, wherein the gripper movement mechanism further has a turning mechanism for turning the base block in a plane including the longitudinal direction and the height direction of the workpiece.

7. The workpiece retention device according to claim 1, wherein the gripper movement mechanism has a radial movement mechanism for radially moving the plurality of grippers.

8. A workpiece retention method for causing the workpiece retention device according to claim 1 to retain the workpiece, the method comprising:
causing the gripper movement mechanism to move the plurality of grippers in accordance with the design shape of the workpiece;
installing the workpiece in the workpiece support member of each of the plurality of grippers;
causing the block movement mechanism to move the movement block relative to the base block, toward the first flange of the workpiece supported by the workpiece support member; and causing the suction mechanism disposed in the movement block to suction the workpiece main body on the first flange side.

9. The workpiece retention method according to claim 8, further comprising:
causing a clamp mechanism disposed in the base block to clamp the second flange after the causing the suction mechanism, in a case where the workpiece retention device includes the clamp mechanism for clamping the second flange of the workpiece.

10. A workpiece retention device for retaining a workpiece, the workpiece retention device comprising:
a plurality of grippers disposed side by side in a first direction; and
a gripper movement mechanism for moving the plurality of grippers according to a predetermined shape of the workpiece,
wherein each of the plurality of grippers has
a base block connected to the gripper movement mechanism,
a workpiece support member on the base block and configured to receive and support the workpiece,
a movement block above the base block and configured to move relative to the base block so as to be movable toward the workpiece,
a block movement mechanism configured to move the movement block relative to the base block, and
a suction mechanism disposed in the movement block and configured to suction the workpiece, wherein
in response to the workpiece retention device receiving the workpiece,
wherein the predetermined shape of the workpiece includes
a curvature along a longitudinal direction of the workpiece, and
a cross section orthogonal to the longitudinal direction having a Z-shape, the cross section including
a workpiece main body extending in a height direction of the workpiece,
a first flange on one side of the workpiece main body in the height direction, and
a second flange on another side of the workpiece main body in the height direction, the first flange protruding to one side in a width direction of the workpiece being orthogonal to the height direction and the second flange protruding to another side in the width direction,
the gripper movement mechanism is configured to move the plurality of grippers to conform the workpiece support members of the plurality of grippers to the curvature of the workpiece,
the workpiece support member of each of the plurality of grippers is configured to support the second flange of the workpiece so that the longitudinal direction of the workpiece extends in the first direction and the height direction of the workpiece extends in a second direction of the workpiece retention device being orthogonal to the first direction,
the block movement mechanism of each of the plurality of grippers is configured to move a corresponding movement block toward the first flange of the workpiece, and
the suction mechanism of each of the plurality of grippers is configured to suction the workpiece main body on a side with the first flange.

* * * * *